United States Patent
Chandrasekaran et al.

(10) Patent No.: US 11,558,078 B1
(45) Date of Patent: Jan. 17, 2023

(54) LOOKUP TABLE (LUT) INTERPOLATION WITH OPTIMIZED MULTIPLIER WIDTH USING COMPANDING IN CORRECTION SLOPE

(71) Applicant: Analog Devices International Unlimited Company, Limerick (IE)

(72) Inventors: Praveen Chandrasekaran, Bangalore (IN); Kaustubh Pradeepkumar Mundhada, Dhamangaon Rly (IN)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/404,975

(22) Filed: Aug. 17, 2021

(51) Int. Cl.
*H04B 1/40* (2015.01)
*H04B 1/04* (2006.01)

(52) U.S. Cl.
CPC ............. *H04B 1/40* (2013.01); *H04B 1/0475* (2013.01); *H04B 2001/0425* (2013.01)

(58) Field of Classification Search
CPC .................... H04B 1/04; H04B 1/0475; H04B 2001/0425; H04B 3/46; H04B 1/40
USPC ............................ 375/219, 240.03, 295–297
See application file for complete search history.

(56) References Cited

U.S. PATENT DOCUMENTS

| | | | | |
|---|---|---|---|---|
| 5,005,082 | A * | 4/1991 | Zdepski .................... | H04N 5/21 348/613 |
| 6,720,999 | B1 * | 4/2004 | Holberg ................. | H04N 5/335 348/241 |
| 7,653,448 | B2 * | 1/2010 | Zoso ...................... | H04N 5/605 381/2 |
| 8,311,149 | B2 | 11/2012 | Jeong et al. | |
| 8,576,944 | B2 * | 11/2013 | Chen .................... | H04L 27/2614 341/20 |
| 11,283,666 | B1 * | 3/2022 | McCormick ............ | H04B 1/04 |
| 2002/0090059 | A1 * | 7/2002 | Berrier ..................... | H04B 3/46 379/22.03 |
| 2003/0098805 | A1 * | 5/2003 | Bizjak ...................... | H03G 3/32 341/139 |
| 2009/0207938 | A1 * | 8/2009 | Jeong .................. | H04L 25/4906 375/296 |
| 2016/0204809 | A1 * | 7/2016 | Pratt ....................... | H04B 1/40 375/219 |

* cited by examiner

*Primary Examiner* — Emmanuel Bayard
(74) *Attorney, Agent, or Firm* — Akona IP PC (57) ABSTRACT

Systems, devices, and methods related to interpolation are provided. An example apparatus includes a slope calculator to calculate a slope value based on a first value and a second value associated with a function. The apparatus further includes a compander to compand the slope value to provide a companded slope value having a smaller bit-width than the calculated slope value. The apparatus further includes a multiplier to multiply the companded slope value by a third value to provide a correction value. The apparatus further includes an adder to add the correction value to the first value or the second value to provide an interpolated value associated with the function. Companding the slope value can reduce a bit-width of the multiplier, and thus may reduce power consumption and/or area.

20 Claims, 6 Drawing Sheets

LOOKUP TABLE (LUT) INTERPOLATION WITH OPTIMIZED MULTIPLIER WIDTH USING COMPANDING IN CORRECTION SLOPE

TECHNICAL FIELD OF THE DISCLOSURE

The present disclosure generally relates to electronics, and, more specifically, to interpolation for lookup table, for example, in digital predistortion (DPD) for circuits with nonlinear responses.

BACKGROUND

Both, systems used for wireless communication such as Long Term Evolution (LTE) and 5th generation (5G), and systems used for cable communication such as cable television networks, are radio systems in that they transmit and receive signals in the form of electromagnetic waves in the radio frequency (RF) range of approximately 3 kiloHertz (kHz) to 300 gigaHertz (GHz). In both of these types of systems a power amplifier that is used to amplify RF signals prior to transmission is a crucial component.

Power amplifiers can generate amplified RF signals that include nonlinear distortions. The response of power amplifiers with nonlinear distortions can result in reduced modulation accuracy (e.g., reduced error vector magnitude (EVM)) and/or out-of-band emissions. Accordingly, communication systems have stringent specifications on power amplifier linearity.

DPD can be applied to enhance the linearity of a power amplifier. Typically, DPD involves applying, in the digital domain, predistortion to an input signal to be provided as an input to a power amplifier to reduce and/or cancel distortion that is expected to be caused by the power amplifier. The predistortion can be characterized by a power amplifier model. For instance, a transmitter using a certain power amplifier may perform DPD in the digital domain to pre-distort a signal to be transmitted using the power amplifier. The pre-distorted signal may include a signal response that approximates the inverse of the power amplifier nonlinear response. Consequently, the signal output by the power amplifier may provide better linearity.

The computation of nonlinear functions can be complex and thus may utilize a high processing power. To reduce the processing load, a nonlinear function represented by $y=f(x)$ can be implemented using an LUT. In this regard, function values or output values y for a subset of all possible input argument values x of the nonlinear function f(.) can be precomputed (e.g., offline) and stored in an LUT. During runtime, an output value y for an input argument x can be obtained from the LUT rather than computing in real-time. The LUT can be stored in memory, for example, in static random-access memory (SRAM) or register(s). The amount of memory used for storing the LUT may be proportional to the number of entries in the LUT. As the number of LUT entries increases, the storage of the LUT can take a toll on the overall area and/or power of a device (e.g., the computing apparatus or the RF transceiver in the case of implementing DPD using LUT). One approach to reducing the number of entries in an LUT (e.g., for $y=f(x)$) and hence power and/or area consumption is to store function values for a smaller set of input argument values x and use interpolation to calculate function values between the LUT sample points.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

For purposes of illustrating techniques for implementing nonlinear functions using LUTs, it may be useful to understand how interpolation may be used to reduce the size or the number of entries for an LUT. The following foundational information may be viewed as a basis from which the present disclosure may be properly explained. Such information is offered for purposes of explanation only and, accordingly, should not be construed in any way to limit the broad scope of the present disclosure and its potential applications.

As described above, LUTs can be used for computation of nonlinear functions to reduce processing load and an LUT can store output values of a function for a smaller set of input argument values to reduce memory usage. As an example, an LUT may store function values for a nonlinear function, represented by $y=f(x)$. More specifically, the LUT may store a function value y for each input argument value x (in a subset of possible input argument values less than all possible input argument values) such that when the LUT is read by using the input argument value x as the address (e.g., indexed into the LUT), the value read from the LUT equals to the function value $y=f(x)$. To obtain a value y for an input argument X outside the subset of x values used for generating the LUT, interpolation may be performed based on $y(X1)$ and $y(X2)$ stored in LUT, where $X1<X<X2$.

Interpolation may be implemented in a variety of ways. In some instances, a linear piecewise interpolation may be used to interpolate $y(X1)$ and $y(X2)$ to obtain $y(X)$. The operations of interpolation may include a slope calculation based on $y(X1)$ and $y(X2)$, a correction value computation based on the slope, and an addition to add the correction value to $y(X1)$ or $y(X2)$. The correction value computation may include a multiplication, for example, implemented using a multiplier. The bit-width of a multiplier may depend on the bit-widths of the multiplicands (e.g., inputs to the multiplier). In general, the larger the bit-widths of the multiplicands, the higher the bit-widths of the multiplier. Multipliers having high bit-widths may consume high power and a large area (e.g., die size or device size). Accordingly, it may be desirable to reduce the bit-width of the multiplier used for the interpolation of the LUT values to reduce power and/or area.

The present disclosure describes mechanisms for reducing area and power for LUT interpolation by companding a slope value used for the LUT interpolation. As used herein, LUT interpolation refers to the operations of performing table lookup and interpolating LUT sample points to obtain a function value between LUT sample points. For example, an apparatus may compute a function, y=f(x), by storing an LUT with function values y in a memory block for a subset of input argument values x. To compute a function value y for an input argument X outside the subset of input argument values x, the apparatus may include a bit extractor to partition the input argument X into two bit portions, for example, an upper bit or most-significant bit (MSB) portion, which may be represented by $X_{MSB}$, and a lower bit or least-significant bit (LSB) portion, which may be represented by $X_{LSB}$. The apparatus may further include an address generator to generate addresses (e.g., memory addresses) using $X_{MSB}$. For instance, the address generator may generate a first address using $X_{MSB}$ and a second address using $X_{MSB}+1$. The apparatus may read the memory block where the LUT is stored using the first address $X_{MSB}$ and the second address $X_{MSB}+1$. That is, the first address and the second address are successive memory addresses of locations where successive LUT values (e.g., successive LUT sample points) are stored. The reading of the memory block using the first address may return a first value, which may be represented by $LUT(X_{MSB})$ corresponding to $f(X_{MSB})$. The reading of the memory block using the second address may return a second value, which may be represented by $LUT(X_{MSB}+1)$ corresponding to $f(X_{MSB}+1)$.

The apparatus may further include a slope calculator to calculate a slope based on the first value $LUT(X_{MSB})$ and the second value $LUT(X_{MSB}+1)$. In some embodiments, the slope calculator may compute the slope by subtracting the second value $LUT(X_{MSB}+1)$ from the first value $LUT(X_{MSB})$. According to embodiments of the present disclosure, the apparatus may further include a compander to compand the slope value. The compander may reduce a dynamic range of the slope value. That is, the compander may provide a companded slope value having a smaller bit-width than the initially calculated slope value. The compander may perform companding in a variety of ways. In some embodiments, the compander may compand the slope value based on at least in part on occurrences of leading zero bits (e.g., most-significant zero bits) or leading non-zero bits (e.g., most-significant one bits) in the slope value. For instance, when the slope value is positive, the slope value may include one or more leading zero bits. Conversely, when the slope value is negative, the slope value may include one or more leading non-zero bits (i.e., one bits). To provide a companded slope value with a reduced bit-width, the compander may discard at least the leading zeros bits for a positive slope value or discard at least the leading non-zero bits for a negative slope value. The compander may output one or more bits (e.g., L bits) of the slope value subsequent to and adjacent to the discarded bits. The number of L bits output by the compander may be based on a tradeoff between the desired accuracy or resolution for the slope value and area and/or power consumption for the apparatus.

As explained above, as part of the LUT interpolation, a correction value is computed based on the slope value. To that end, the apparatus may compute the correction value using a multiplier to multiply the slope value by a third value corresponding to the lower bits or LSBs (e.g., $X_{LSB}$) of the input argument X. Because the bit-width of the companded slope value is reduced compared to the initially calculated slope value (before the companding), the apparatus can utilize a multiplier with a smaller bit-width and thus may reduce the area (e.g., die size or device size) and power consumption of the multiplier.

Since multiplication of an M-bit integer number by an N-bit integer number results in an (M+N)-bit product, a right bit-shift operation (e.g., by N bits) is performed on the product to provide a correct result. As such, the apparatus may further include a bit-shifter to bit-shift the correction value to the right. The bit-shifter may account for the reduced bit-width for the slope from companding. For instance, the bit-shifter may right-shift the correction value by a bit-value computed by subtracting the number of companded or discarded bits from the bit-width of the third value $X_{LSB}$ The apparatus may further include an adder to add the bit-shifted correction value to the first value $X_{MSB}$ to provide an interpolated value approximating the output value y of the function f(.) evaluated for input argument X.

In some embodiments, the apparatus may be an RF transceiver including a DPD circuit that generates a pre-distortion signal for pre-compensation of a distortion caused by an RF frontend component (e.g., power amplifier). In such embodiments, the LUT may store function values of a nonlinear function that approximates an inverse response of the distortion, and the DPD circuit may implement the LUT interpolation using techniques described herein.

The systems, schemes, and mechanisms described herein advantageously reduce area (e.g., device area or die size) and power of an apparatus or device by utilizing a multiplier with an optimized bit-width for LUT interpolation. While the present disclosure is described in the context of nonlinear function computation and/or DPD in an RF transceiver, the present disclosure is suitable for use in any types of implementations or applications that perform interpolation.

Example LUT Interpolation

Figure 1:
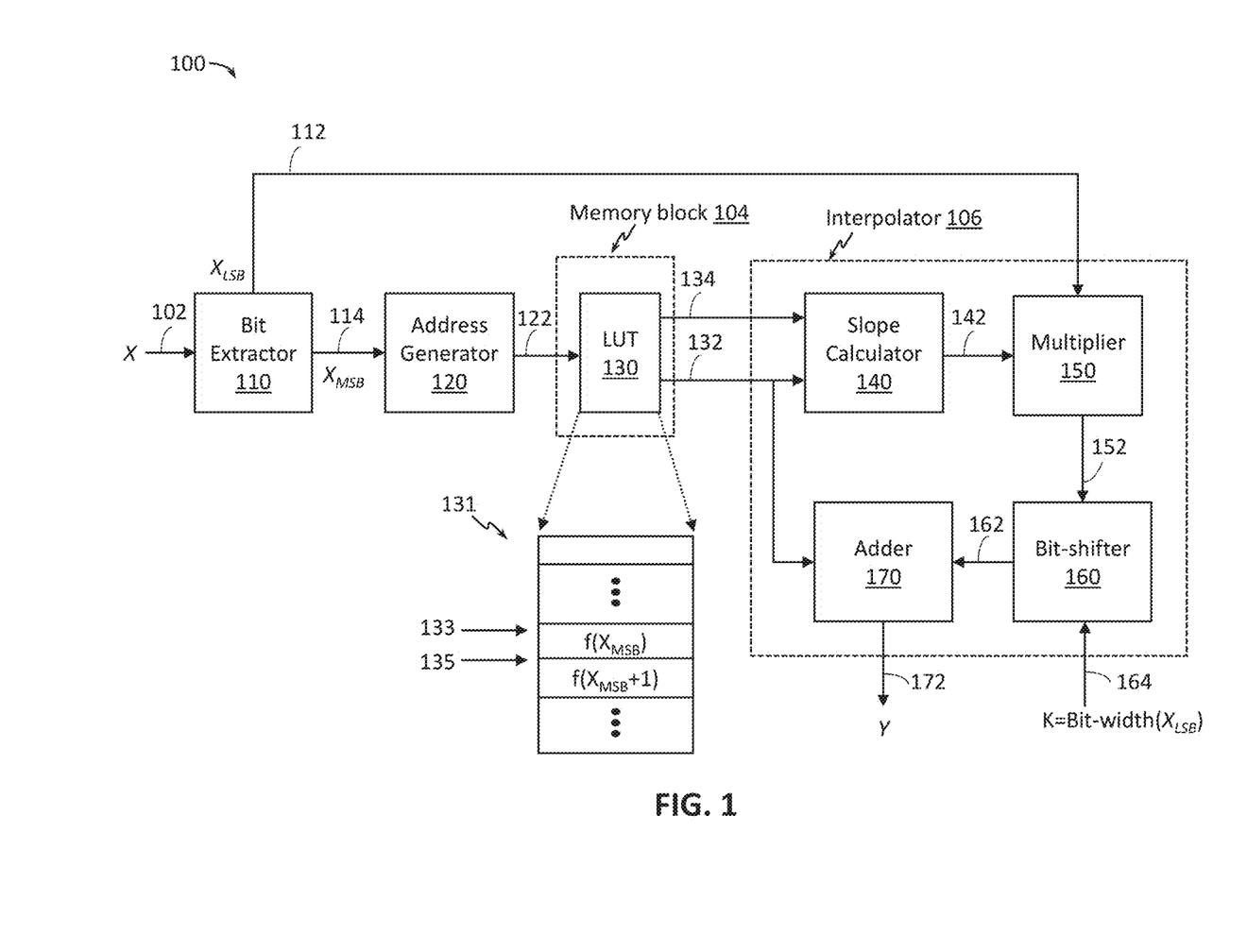
FIG. 1 is a schematic block diagram illustrating an exemplary apparatus implementing a function using a combination of lookup table (LUT) and interpolation, according to some embodiments of the present disclosure.

FIG. 1 is a schematic block diagram illustrating an exemplary apparatus 100 implementing a function using a combination of lookup table (LUT) and interpolation, according to some embodiments of the present disclosure. In some embodiments, the apparatus 100 may be a general-purpose computing apparatus. In other embodiments, the apparatus 100 may be part of a DPD unit, for example, in an RF transceiver as will be described more fully below with reference to FIG. 6. In yet other embodiments, the apparatus 100 may be part of an application-specific apparatus that utilizes LUT interpolation to provide a certain application.

As shown in FIG. 1, the apparatus 100 may include a bit extractor 110, an address generator 120, a memory block 104, and an interpolator 106. The interpolator 106 may include a slope calculator 140, a multiplier 150, a bit-shifter 160, and an adder 170. Each of the bit extractor 110, the address generator 120, the slope calculator 140, the multiplier 150, the bit-shifter 160, and the adder 170 may include a combination of hardware, software, and/or firmware configured to implement corresponding operations. In certain embodiments, one or more of the bit extractor 110, the address generator 120, the slope calculator 140, the multiplier 150, the bit-shifter 160, and/or the adder 170 may utilize hardware implementation, for example, using circuitries, logics, and/or gates, to implement corresponding operations. Moreover, in some embodiments, one or more of the bit extractor 110, the address generator 120, the slope calculator 140, the multiplier 150, the bit-shifter 160, and/or the adder 170 can include programmable controls, for example, to configure and/or modify certain functionalities of the corresponding hardware block such as the input and/or output bit-widths.

The apparatus 100 may implement a function, which may be represented by f(.), using LUT interpolation mechanisms. In some instances, the function f(.) may be a nonlinear function, for example, approximating an inverse response of a nonlinear distortion in the case of an implementation of a DPD. In general, the function f(.) can be any suitable nonlinear or linear functions. The function values may be represented by y=f(x), where x is the input argument to the function f(.). An LUT implementation of the function f(.) may include generating function values y for a subset of all possible input argument values x and storing the function values y in an LUT 130. In other words, the LUT 130 may store a set of sample points of the function f(.).

In the illustrated example of FIG. 1, the LUT 130 is stored in the memory block 104 of the apparatus 100. In general, the memory block 104 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory."

To implement the function f(x), the bit extractor 110 may receive an input value 102, which may be represented by X, as the input argument to the function f(x). In certain embodiments, the input value X may correspond to a signal sample in an input signal. The bit extractor 110 may partition the input argument X into two portions, for example, an upper bit portion or most-significant bit (MSB) portion 114, which may be represented by $X_{MSB}$, and a lower bit portion or least-significant bit (LSB) portion 112, which may be represented by $X_{LSB}$. In some embodiments, $X_{MSB}$ may have a bit-width as wide as the LUT 130 addresses, and $X_{LSB}$ may have a bit-width corresponding to the number of remaining bits in the input value X. In some embodiments, the bit extractor 110 may be implemented using hardware circuitry including, but not limited to, bit extraction logics to select desired bits from the signal (e.g., in case of a fixed LUT depth is used for the LUT 130) and/or multiplexers to choose appropriate bits (e.g., in case of a variable LUT depth is used for the LUT 130).

The address generator 120 is coupled to the bit extractor 110 to receive the MSB portion 114, $X_{MSB}$. The address generator 120 may generate addresses to consecutive entries of the LUT 130 based on the MSB portion 114 $X_{MSB}$. For instance, the address generator 120 may generate a first address using $X_{MSB}$ and a second address using $X_{MSB}+1$, where input value X may be greater than $X_{MSB}$ and less than $X_{MSB}+1$ (e.g., $X_{MSB}<X<X_{MSB}+1$). A more detailed view of the storage of the LUT 130 in the memory block 104 is shown by 131 where the LUT 130 includes a plurality of entries each storing a sample point or function value y for the function f(x) in a sequential order of input argument x. In some embodiments, the size or number of entries in the LUT 130 is 2 to the power of $X_{MSB}$ bit-width. Stated differently, the $X_{MSB}$ bit-width corresponds to log 2(LUT 130 size). The first address generated using $X_{MSB}$ is shown by 133 and the second address generated using $X_{MSB}+1$ is a next address to the LUT 130 as shown by 135. That is, the first address 133 $X_{MSB}$ and the second address 135 $X_{MSB}+1$ are successive memory addresses of locations where successive LUT values (e.g., successive LUT sample points) are stored. The reading of the memory block 104 or the LUT 130 using the first address 133 may return a first value 132, which may be represented by LUT($X_{MSB}$) corresponding to f($X_{MSB}$). Similarly, the reading of the memory block 104 or the LUT 130 using the second address 135 may return a second value 134, which may be represented by LUT($X_{MSB}+1$) corresponding to f($X_{MSB}+1$). In some embodiments, the address generator 120 may be implemented using hardware circuitry including, but not limited to, adder(s) for obtaining the absolute address value for a particular LUT and/or incrementer(s) for generating an address of a next location.

The interpolator 106 may interpolate the first value 132, LUT($X_{MSB}$), and the second value 134, LUT($X_{MSB}+1$), to obtain an interpolated value corresponding to an approximated function value Y for f(X) according to the following expression:

$$Y(X) = LUT(X_{MSB}) + \text{Correction}. \quad (1)$$

The value for the correction may be computed according to the following expression:

$$\text{Correction} = \frac{\text{Slope} * X_{LSB}}{\left(2^{\wedge} X_{LSB}\text{WIDTH}\right)}. \quad (2)$$

where $X_{LSB}$ WIDTH represents the bit-width (number of bits) of the LSB portion 112, $X_{LSB}$. The value for the slope may be computed according to the following expression:

$$\text{Slope} = (LUT(X_{MSB}+1) - LUT(X_{MSB})). \quad (3)$$

As shown in FIG. 1, the slope calculator 140 is coupled to the memory block 104 to receive the first value 132, LUT($X_{MSB}$), and the second value 134, LUT($X_{MSB}+1$). In some embodiments, the slope calculator 140 may include a subtractor to calculate a difference between the LUT value for $X_{MSB}$ (nearest value to input value X) and the LUT value for $X_{MSB}+1$ (next nearest to input value X). For instance, the slope calculator 140 may subtract the first value 132, LUT($X_{MSB}$), from the second value 134, LUT($X_{MSB}+1$), to provide a slope value 142 according to equation (3). In some embodiments, the slope calculator 140 may be implemented using hardware circuitry including, but not limited to, ripple carry subtractor, carry save subtractor, and/or carry lookahead subtractor.

The multiplier 150 is coupled to the slope calculator 140 to receive the slope value 142. The multiplier 150 may multiply the slope value 142 (e.g., the complete or full slope value 142 including all bits output from the subtraction) by a third value corresponding to the LSB portion 112, $X_{LSB}$, to provide a correction value 152. In some embodiments, the multiplier 150 may be implemented using hardware circuitry including, but not limited to, binary multiplier, booths multiplier and/or Wallace tree multiplier. The multiplier 150 may have a bit-width supporting the bit-widths of the multiplicands (e.g., inputs to the multiplier 150). That is, the bit-width of the multiplier 150 may be based on the bit-width of the slope value 142 and the bit-width of $X_{LSB}$. The slope value 142 bit-width corresponds to the LUT 130 data bit-width+1. The $X_{LSB}$ bit-width corresponds to the argument X bit-width −log 2(LUT 130 size).

As explained above, multiplication of an M-bit integer number by an N-bit integer number results in an (M+N)-bit product and a right bit-shift operation (e.g., by N bits) is performed on the product to provide a correct result. Accordingly, the bit-shifter 160 is coupled to the multiplier 150 to right-shift the correction value 152 by a bit-shift value. The bit-shift value may correspond to the $X_{LSB}$ bit-width 164, denoted as K=Bit-width ($X_{LSB}$), to provide a bit-shifted correction value 162. As can be observed, the multiplier 150 and the bit-shifter 160 operate to calculate the correction value as shown in equation (2) above. In some embodiments, the bit-shifter 160 may be implemented using hardware circuitry including, but not limited to barrel shifter, multiplexer, and/or priority multiplexer.

The adder 170 is coupled to the bit-shifter 160 to receive the bit-shifted correction value 162 and coupled to the memory block 104 to receive the first value 132 (e.g., $X_{MSB}$) The adder 170 computes a sum of the first value 132 $X_{MSB}$ and the correction value 162 to provide an output value 172, which may be represented by Y, for input value X. In some embodiments, the adder 170 may be implemented using hardware circuitry including, but not limited to, ripple carry adder, carry save adder, and/or carry lookahead adder.

As an example, the input value X may have a bit-width of 15, the LUT 130 may have a size of 64 entries, and thus the bit extractor 110 may extract 6 MSBs of the input value X for the address generator 120 to generate the first address 133 and the second address 135. The interpolator 106 may compute a correction value 162 using the slope calculator 140, the multiplier 150, and the bit-shifter 160. The interpolator 106 may further compute a sum of the remaining 9-bits (9 LSBs) of the input value X and the correction value 162 to provide an output value Y corresponding to f(X).

While LUT interpolation can be implemented using mechanisms shown in FIG. 1, the use of the multiplier 150 may not be efficient in terms of power and/or area. For instance, to add the correction value 152 calculated from the multiplier 150, the lower bits of the correction value 152 are discarded by the right-bit-shift operations at the bit-shifter 160. The number of bits discarded (right-shifted out) are equal to (argument X bit width −log 2(LUT 130 Size)). As explained above, multipliers can take higher power and a larger area for higher bit-widths. Recognizing the lower bits of the correction value 152 are discarded after the multiplication, the present disclosure provides techniques to reduce the multiplier bit-width by companding the slope value 142 prior to the multiplication and reducing the number of bits to be discarded after the multiplication with minimal or negligible performance loss.

Example LUT Interpolation with Multiplier Bit-Width Optimization

Figure 2:
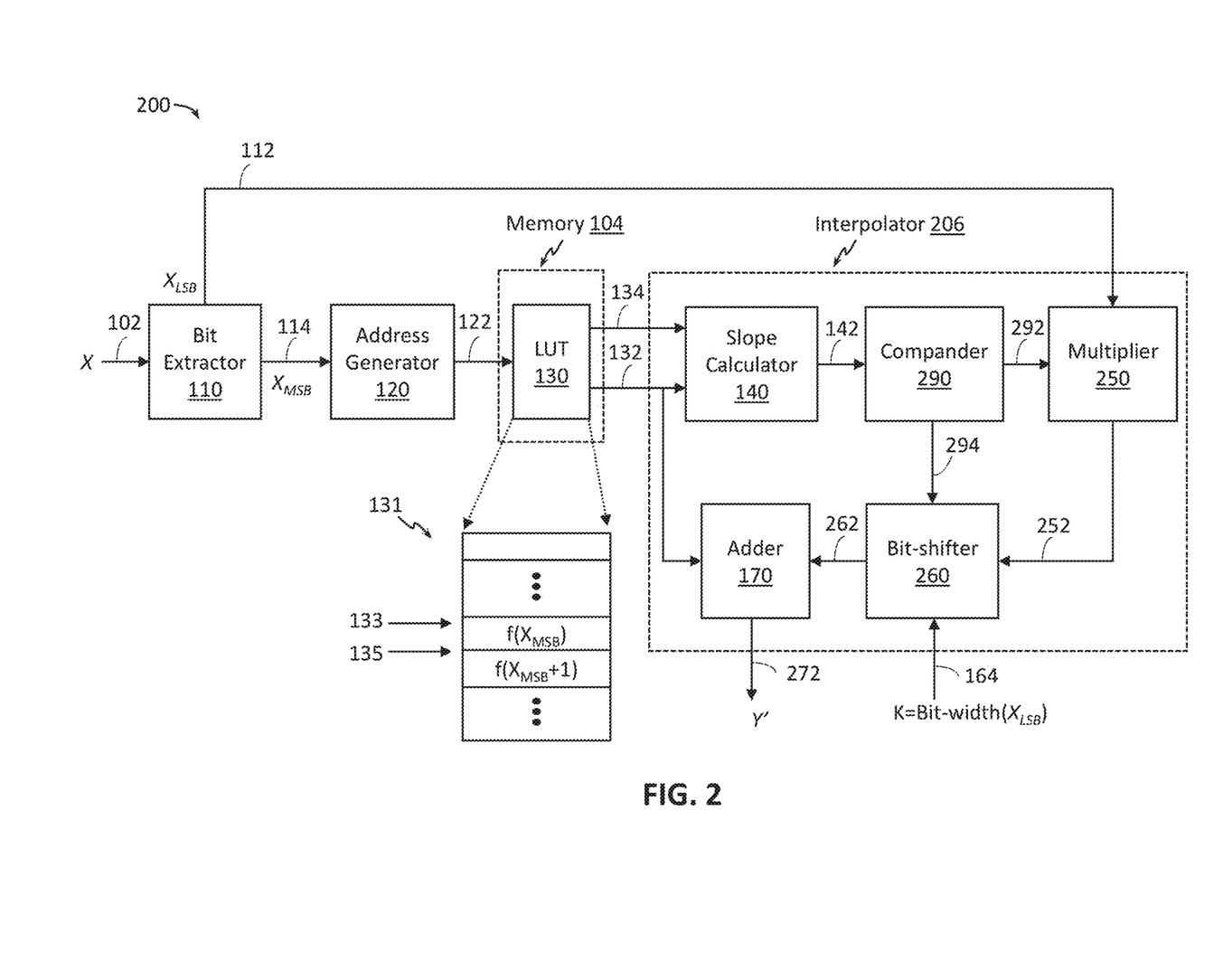
FIG. 2 is a schematic block diagram illustrating an exemplary apparatus utilizing a multiplier with an optimized bit-width for LUT interpolation, according to some embodiments of the present disclosure.

FIG. 2 is a schematic block diagram illustrating an apparatus 200 utilizing a multiplier with an optimized bit-width for LUT interpolation, according to some embodiments of the present disclosure. Generally speaking, the apparatus 200 is similar to the apparatus 100 in many respects. For example, the apparatus 200 shares the same blocks including a bit extractor 110, an address generator 120, a memory block 104, a slope calculator 140, and an adder 170 as the apparatus 100 of FIG. 1. For brevity's sake, a discussion of these blocks is not repeated, and these blocks may take the form of any embodiments disclosed herein.

To provide an optimized multiplier bit-width, the apparatus 200 further includes a compander 290, a multiplier 250 with the optimized multiplier bit-width, and a bit-shifter 260. As shown in FIG. 2, the apparatus 200 includes an interpolator 206 including the slope calculator 140, the compander 290, the multiplier 250, the bit-shifter 260, and the adder 170. Similar to the apparatus 100 of FIG. 1, each of the compander 290, the multiplier 250, and the bit-shifter 260 may include a combination of hardware, software, and/or firmware configured to implement corresponding operations. In certain embodiments, one or more of the compander 290, the multiplier 250, and/or the bit-shifter 260 may utilize hardware implementation, for example, using circuitries, logics, and/or gates, to implement corresponding operations. Moreover, in some embodiments, one or more of the compander 290, the multiplier 250, and/or the bit-shifter 260 may include programmable controls, for example, to configure and/or modify certain functionalities of the corresponding hardware block such as the input and/or output bit-widths.

As explained above, the slope calculator 140 may provide a slope value 142 based on a difference between LUT($X_{MSB}$) and LUT($X_{MSB}$+1) according to equation (3). In the apparatus 200 of FIG. 2, the compander 290 is coupled to the slope calculator 140 to compand the initially calculated slope value 142 (e.g., a full or complete slope value) prior to the multiplication with the LSB portion 112 $X_{LSB}$ of the input argument value X. Companding may reduce the dynamic range (e.g., number of bits) of the slope value. The compander 290 may perform companding using any suitable companding functions or algorithms.

In some embodiments, the compander 290 may compand the slope value 142 based on occurrence of one or more most-significant non-zero bits or one or more most-significant zero bits in the slope value 142. In this regard, the compander 290 may discard one or more leading or most-significant zero bits in the slope value 142 or discard one or more leading or most-significant non-zero bits (i.e., bits with bit-value of 1) in the slope value 142. For instance, when the slope value 142 is positive (e.g., >=0), the slope value 142 may include one or more leading or most-significant zero bits. On other hand, when the slope value 142 is negative (e.g., <0), the slope value 142 may include one or more leading or most-significant non-zero or one bits. As such, the compander 290 may discard one or more leading or most-significant zero bits if the slope value 142 is positive or discard one or more leading or most-significant non-zero or one bits if the slope value 142 is negative.

The compander 290 may be implemented in a variety of ways, for example, by applying a right-shift to discard the one or more leading or most-significant non-zero or one bits followed by a logical-AND operation to extract a block of one or more bits adjacent to and immediately following the discarded bits for output. In some instances, the compander 290 may include hardware circuitry (e.g., a bit comparator) to determine whether the slope value 142 is positive or negative. Based on the sign determination, the compander 290 may include hardware circuitry (e.g., bit-shifting logics, bit-extraction logics, multiplexers and/or priority multiplexers) to discard corresponding leading zero bits or leading non-zero bits, by outputting a bit portion of the slope value 142 immediately following the discarded bits. In other words, the compander 290 may output a portion of the slope value 142, which may be referred to as a companded slope value 292. Accordingly, the companded slope value 292 has a smaller bit-width than the initially calculated slope value 142. In some instances, the output bit portion of the slope value 142 may include less than all remaining bits in the slope value 142 after discarding the one or more leading zero-bits or one or more leading non-zero bits. In other words, one or more LSBs of the slope value 142 may also be discarded to generate the companded slope value 292. The companding will be discussed more fully below with reference to FIGS. 3 and 4.

The multiplier 250 is coupled to the compander 290 to receive the companded slope value 292. The multiplier 250 may multiply the companded slope value 292 (including less number of bits than the full or complete slope value 142) by a third value corresponding to the LSB portion 112, $X_{LSB}$, to provide a correction value 252. In some embodiments, the multiplier 250 may be substantially similar to the multiplier 150 of FIG. 1, but may have a reduced multiplier bit-width compared to the multiplier 150. As explained above, the multiplier 150 may include a multiplier bit-width that supports two inputs, one having the slope value 142 bit-width (e.g., M bits) and the other having the $X_{LSB}$ bit-width (e.g., N bits). Here, the multiplier 250 may include an optimized bit-width that supports two inputs, one having the companded slope value 292 bit-width (e.g., equals to M bits–number of companded bits or discarder bits) and the other may have the same $X_{LSB}$ bit-width (e.g., N bits). Since the multiplier 250 operates on inputs with a reduced bit-width compared to the multiplier 150, the multiplier 250 may be implemented using a smaller area than the multiplier 150 and may consume less power than the multiplier 150.

The bit-shifter 260 is coupled to the multiplier 250 to right-shift the correction value 252. Because the number of bits in the companded slope value 292 is reduced, the bit-shifter 260 may account for the companded or discarded bits (e.g., the leading zero bits for a positive slope value 142 or the leading one bits for a negative slope value 142) in the bit-shifting operation. For instance, the bit-shifter 260 may right-shift the companded slope value 292 by a bit-value. The bit-shift value may be computed by subtracting the number of companded or discarded bits from the $X_{LSB}$ bit-width 164. In other words, the interpolator 206 discards bits from the slope value 142 prior to the multiplication and adjusts the number of bits for the righty-shift after the multiplication to provide a bit-shifted correction value 262 with the same precision or bit-resolution as the bit-shifted correction value 162 of FIG. 1.

The adder 170 is coupled to the bit-shifter 260 to receive the bit-shifted correction value 262. The adder 170 computes a sum of the first value 132 $X_{MSB}$ and the correction value 262 to provide an output value 272, which may be represented by Y', for input value X.

Accordingly, the operations of the interpolator 206 includes computing the slope value 142 via the slope calculator 140 according to equation (3) discussed above and companding the slope value 142 via the compander 290, where the companding can be expressed as shown below:

$$\text{Slope mod} = \text{Companding(Slope)}, \quad (4)$$

where Slope mod represents the modified or companded slope value 292 and Companding represents the companding function or algorithm. The interpolator 206 further computes the correction factor or correction value 262 via the multiplier 250 and, the bit-shifter 260 as shown below:

$$\text{Correction} = \frac{\text{Slopemod} * X_{LSB}}{(2\char`\^(\text{Right Shift}))}, \quad (5)$$

where Correction represents the correction value 262 and Right Shift represents the bit-shift value computed by subtracting the number of companded or discarded bits from the $X_{LSB}$ bit-width 164. After computing the correction value 262, the interpolator 206 computes the interpolated value 292, Y', by adding the correction value 262 to the LSB portion 112, $X_{LSB}$, of the input argument X similar to equation (1) shown above.

The accuracy of the output value 272, Y', for input value X computed by the apparatus 200 with slope companding may be substantially similar to the accuracy of the value 172, Y, computed by the apparatus 100 without slope companding. Accordingly, the performance loss from the slope companding may be negligible.

Figure 3:
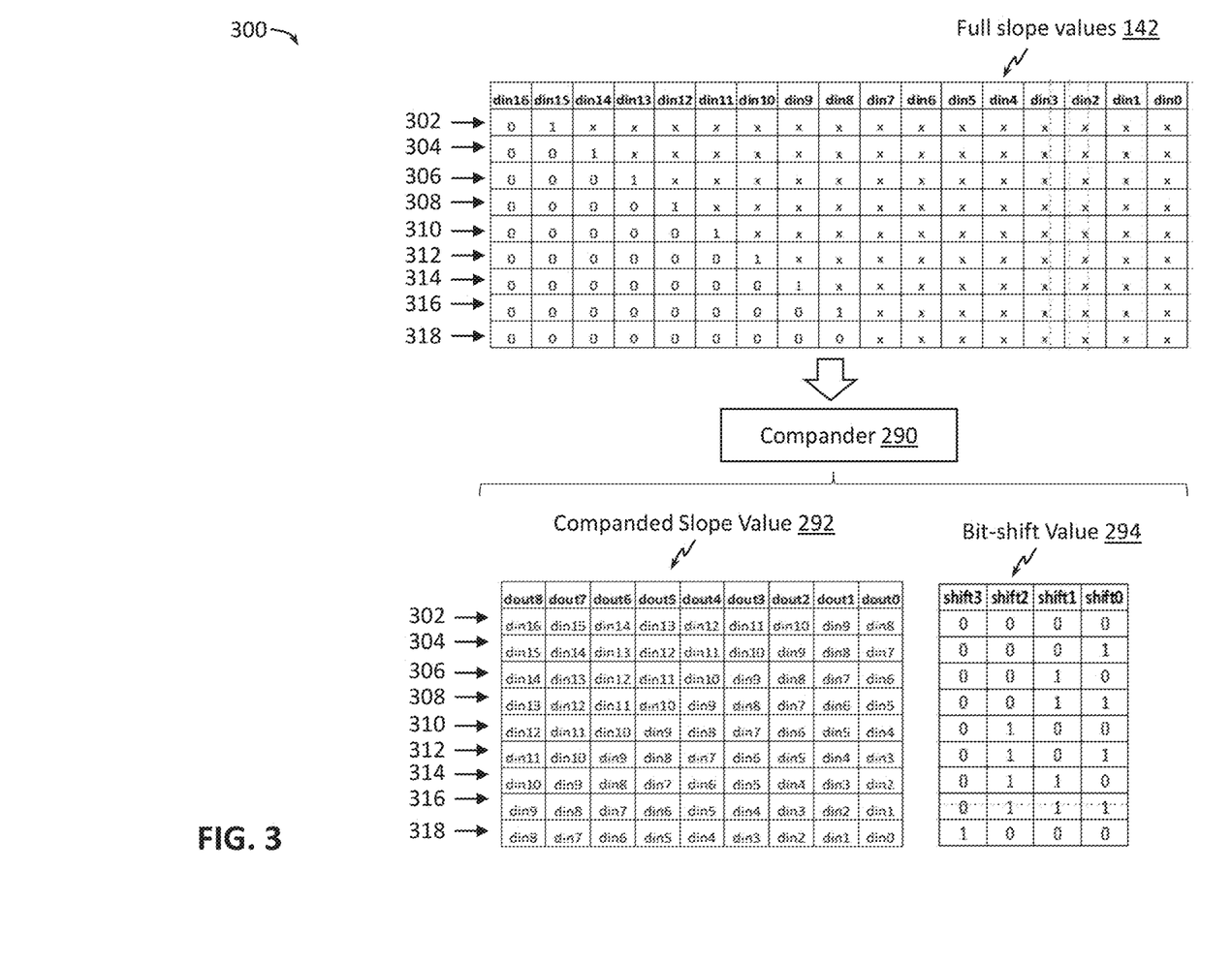
FIG. 3 illustrates an exemplary slope companding scheme, according to some embodiments of the present disclosure.

Example Slope Companding for LUT Interpolation with Multiplier Bit-Width Optimization FIG. 3 illustrates an exemplary slope companding scheme 300, according to some embodiments of the present disclosure. The scheme 300 may be implemented by the compander 290 of FIG. 2 for LUT interpolation. In the illustrated examples of FIG. 3, the full slope value 142 or the difference between successive LUT sample points (e.g., calculated by subtracting the first value 132 LUT($X_{MSB}$) from the second value 134 LUT($X_{MSB}$+1)) may be positive and may have a bit-width of 17. The full slope value 142 may be represented by a two's complement integer number having bits din0 to din16 as shown, where din0 is the LSB and din16 is the MSB. FIG. 3 illustrates various examples 302 to 318 for the full slope values 142. As can be seen, a positive full slope value 142 may have one or more consecutive leading or most-significant zero bits.

To compand a positive slope value 142, the scheme 300 may discard the leading or most-significant consecutive zero bits of the slope value 142 and output a fixed number of bits immediately following the discarded bits as the companded slope 292. Depending on the number of most-significant consecutive zero bits are discarded, as part of outputting the fixed number of bits to provide the companded slope 292, the scheme 300 may also discard one or more LSBs of the slope value 142. To assist bit-shifting after the multiplication (multiplying the companded slope value 142 with $X_{LSB}$), the scheme 300 may also output a bit-shift value 294. In the illustrated example of FIG. 3, the compander 290 outputs a 9-bit companded slope value 292. As shown, in the example 302, the compander 290 outputs a companded value 292 including din8 to din16 of the full slope value 142 and a bit-shift value 294 of 0. In the example 304, the compander 290 outputs a companded value 292 including din7 to din15 of the full slope value 142 (by discarding the leading zero bit din6) and a bit-shift value 294 of 1 (based on one leading zero bit being discarded). In the example 306, the compander 290 outputs a companded value 292 including din6 to din14 of the full slope value 142 (by discarding the leading zero bits din16 and din15) and a bit-shift value 294 of 2 (based on two leading zero bits being discarded). In the example 308, the compander 290 outputs a companded value 292 including din5 to din13 of the full slope value 142 (by discarding the leading zero bits din16 to din14) and a bit-shift value 294 of 3 (based on three leading zero bits being discarded). As can be observed, the bit-shift value 294 does not account for the discarding of din16 because din16 is the sign bit of the 17-bit slope value 142 and is 0 when the slope value 142 is a positive number. The compander 290 may perform similar operations for the other examples 310 to 318.

Figure 4:
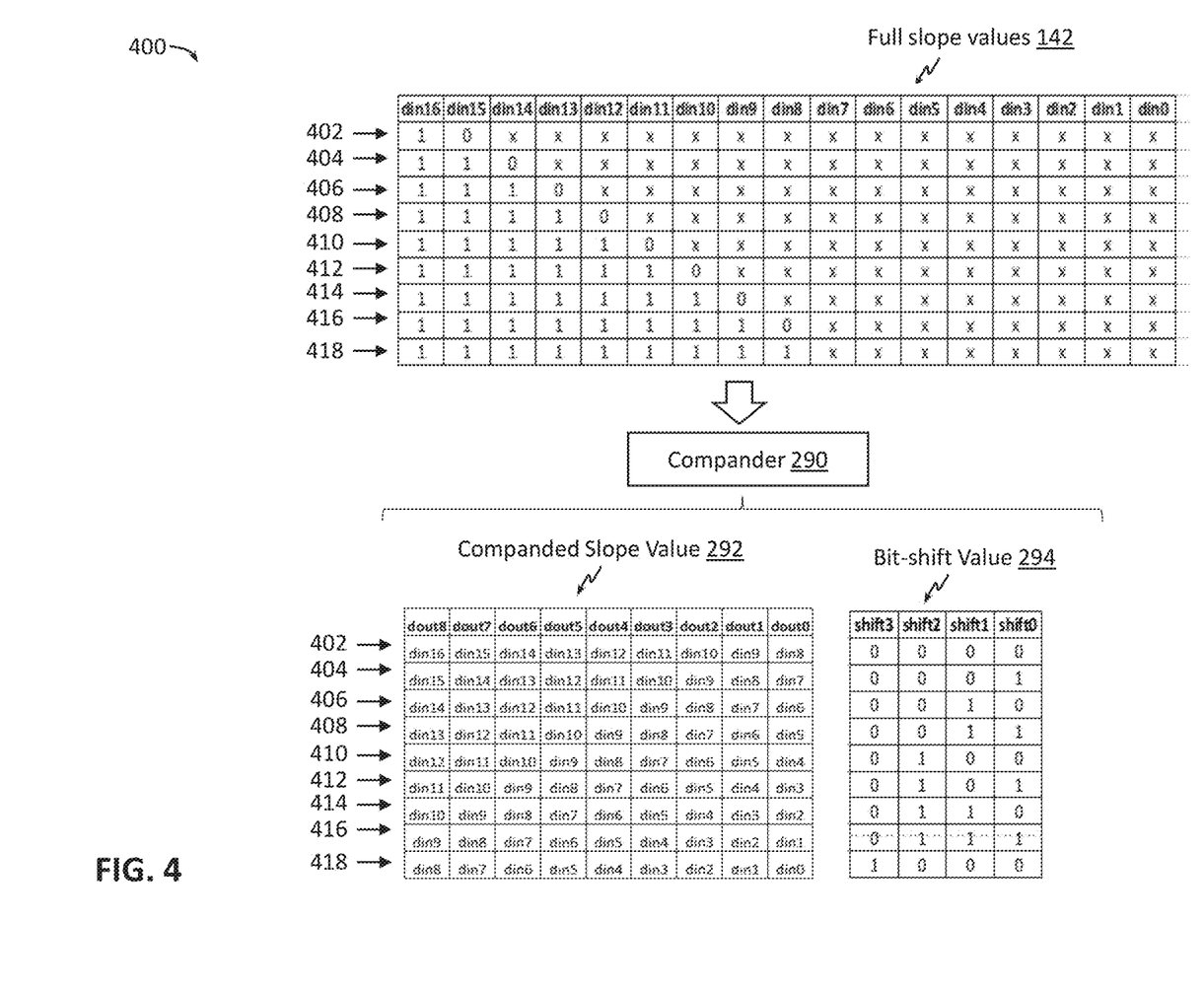
FIG. 4 illustrates another exemplary slope companding scheme, according to some embodiments of the present disclosure.

FIG. 4 illustrates another exemplary slope companding scheme 400, according to some embodiments of the present disclosure. The scheme 400 may be implemented by the compander 290 of FIG. 2 for LUT interpolation and may be similar to the scheme 300 in many respects. However, the scheme 400 illustrates slope companding for a negative full slope value 142. The negative full slope value 142 may be represented by a two's complement integer number having bits din0 to din16 as shown, where din0 is the LSB and din16 is the MSB. FIG. 4 illustrates various examples 402 to 418 for the full slope values 142. As can be seen, a negative full slope value 142 may have one or more consecutive leading or most-significant non-zero or one bits.

To compand a negative slope value 142, the scheme 400 may discard the leading or most-significant consecutive non-zero or one bits of the slope value 142 and output a fixed number of bits immediately following the discarded bits as the companded slope 292. Depending on the number of most-significant consecutive non-zero or one bits are discarded, as part of outputting the fixed number of bits to provide the companded slope 292, the scheme 400 may also discard one or more LSBs of the slope value 142. To assist bit-shifting at after the multiplication (multiplying the companded slope value 142 with $X_{LSB}$), the scheme 400 may also output a bit-shift value 294. In the illustrated example of FIG. 4, the compander 290 outputs a 9-bit companded slope value 292. As shown, in the example 402, the compander 290 outputs a companded value 292 including din8 to din16 of the full slope value 142 and a bit-shift value 294 of 0. In the example 404, the compander 290 outputs a companded value 292 including din7 to din15 of the full slope value 142 (by discarding the leading non-zero bit din6) and a bit-shift value 294 of 1 (based on one leading non-zero bit being discarded). In the example 406, the compander 290 outputs a companded value 292 including din6 to din14 of the full slope value 142 (by discarding the leading non-zero bits din16 and din15) and a bit-shift value 294 of 2 (based on two leading non-zero bits being discarded). In the example 408, the compander 290 outputs a companded value 292 including din5 to din13 of the full slope value 142 (by discarding the leading non-zero bits din16 to din14) and a bit-shift value 294 of 3 (based on three leading non-zero bits being discarded). As can be observed, the bit-shift value 294 does not account for the discarding of din16 because din16 is the sign bit of the 17-bit slope value 142 and is 1 when the slope value 142 is a negative number. The compander 290 may perform similar operations for the other examples 410 to 418.

In some embodiments, the interpolator 206 of FIG. 2 (e.g., the compander 290, the multiplier 250, and the bit-shifter 260) can be implemented using configurable hardware. For instance, the compander 290 may output a flexible number of output bits (e.g., 4, 5, 6, 7, 8, 9 or more) for the companded slope value 292, the multiplier may multiply inputs of a flexible bit-width, and the bit-shifter 260 may perform a flexible number of bit-shifts (e.g., the bit-shift value 294). The output bit-width of the compander 290, the multiplier bit-width of the multiplier 250, and the bit-width of the bit-shift value 294 used by the bit-shifter 260 can be configured to provide a certain accuracy or performance based on the requirements or metrics of the application implemented by the apparatus 200 to optimize area and power consumption of the apparatus 200. Additionally or alternatively, the compander 290, the multiplier 250, and the bit-shifter 260 may allow for programmable controls. As an example, the compander 290 may output a companded value 292 with a bit-width of 8, 9, or 10, where the number of output bits can be selected based on the programmable controls at device initialization or startup. The provision of the programmable controls can reduce the amount of area and/or power optimization. In general, there can be a tradeoff between area and power versus programmability for the interpolator 206.

Figure 5:
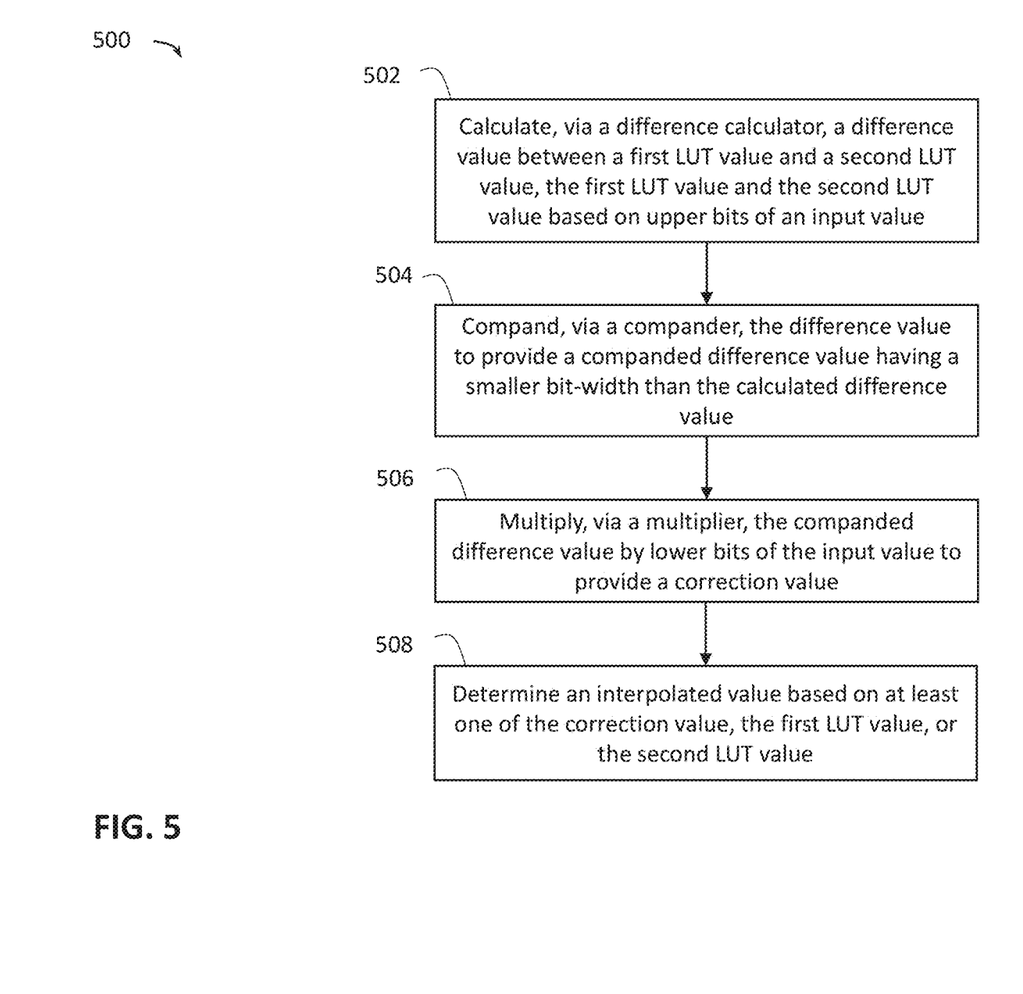
FIG. 5 is a flow diagram illustrating an exemplary method for implementing a function using a combination of LUT and interpolation with slope companding, according to some embodiments of the present disclosure.

FIG. 5 is a flow diagram illustrating an exemplary method 500 for implementing a function using a combination of LUT and interpolation with slope companding, according to some embodiments of the present disclosure. The method 500 can be implemented by the apparatus 200 or any suitable computing device or RF transceiver that implements LUT interpolation. Although the operations of the method 500 may be illustrated with reference to particular embodiments of the apparatus 200 disclosed herein, the method 500 may be performed using any suitable hardware components and/or software components. Operations are illustrated once each and in a particular order in FIG. 5, but the operations may be performed in parallel, reordered, and/or repeated as desired.

At 502, a difference value between a first LUT value and a second LUT value may be generated, for example, using a difference calculator similar to the slope calculator 140 of FIGS. 1 and 2. The first LUT value and the second LUT value may be based on upper bits of an input value. The first LUT value and the second LUT value may be output values evaluated for a function (e.g., a nonlinear function) with input arguments $X_{MSB}$ and $X_{MSB}+1$. For instance, the input value may correspond to the input value 102, X, of FIG. 2. The input value may be partitioned into upper bits corresponding to the MSB portion 114, $X_{MSB}$, and remaining bits corresponding to the LSB portion 112, $X_{LSB}$. The first LUT value and the second LUT value may be obtained by reading an LUT corresponding to the LUT 130.

At 504, the difference value is companded to provide a companded difference value having a smaller bit-width than the difference value calculated at 502, for example, using a compander similar to the compander 290 of FIG. 2. For instance, the difference value may correspond to the full slope value 142 and the companded difference value may correspond to the companded slope value 292 as discussed above with reference to FIG. 2. The companding may include discarding one or more most-significant zero bits or one or more most-significant non-zero bits of the difference value. For instance, the companding may include discarding one or more most-significant zero bits when the difference value is positive as discussed above with reference to FIG. 3. Alternatively, the companding may include discarding one or more most-significant non-zero bits when the difference value is negative as discussed above with reference to FIG. 4.

At 506, the companded difference value is multiplied by lower bits (e.g., $X_{LSB}$) of the input value to provide a correction value, for example, using a multiplier with an optimized multiplier bit-width similar to the multiplier 250.

At 508, an interpolated value is determined based on at least one of the correction value, the first LUT value, or the second LUT value. The determining the interpolated value may include right-shifting the correction value by a bit-shift value, for example, using the bit-shifter 260. The bit-shift value may be based at least in part on a number of the one or more most-significant zero bits or the one or more most-significant non-zero bits in the difference value that were discarded by the companding. For instance, the bit-shift value may be computed by the subtracting the number of discarded zero bits or the number of discarded non-zero bits from the number of bits in the lower bits of the input value (e.g., the $X_{LSB}$ bit-width). The determining the interpolated value may further include adding the bit-shifted correction value to the first LUT value or the second LUT value, for example, using an adder similar to the adder 170. For instance, if the first LUT value corresponds to LUT ($X_{MSB}$) and the second LUT value corresponds to LUT ($X_{MSB}$+1), the interpolated value may be determined by adding the bit-shifted correction value to LUT($X_{MSB}$).

Figure 6:
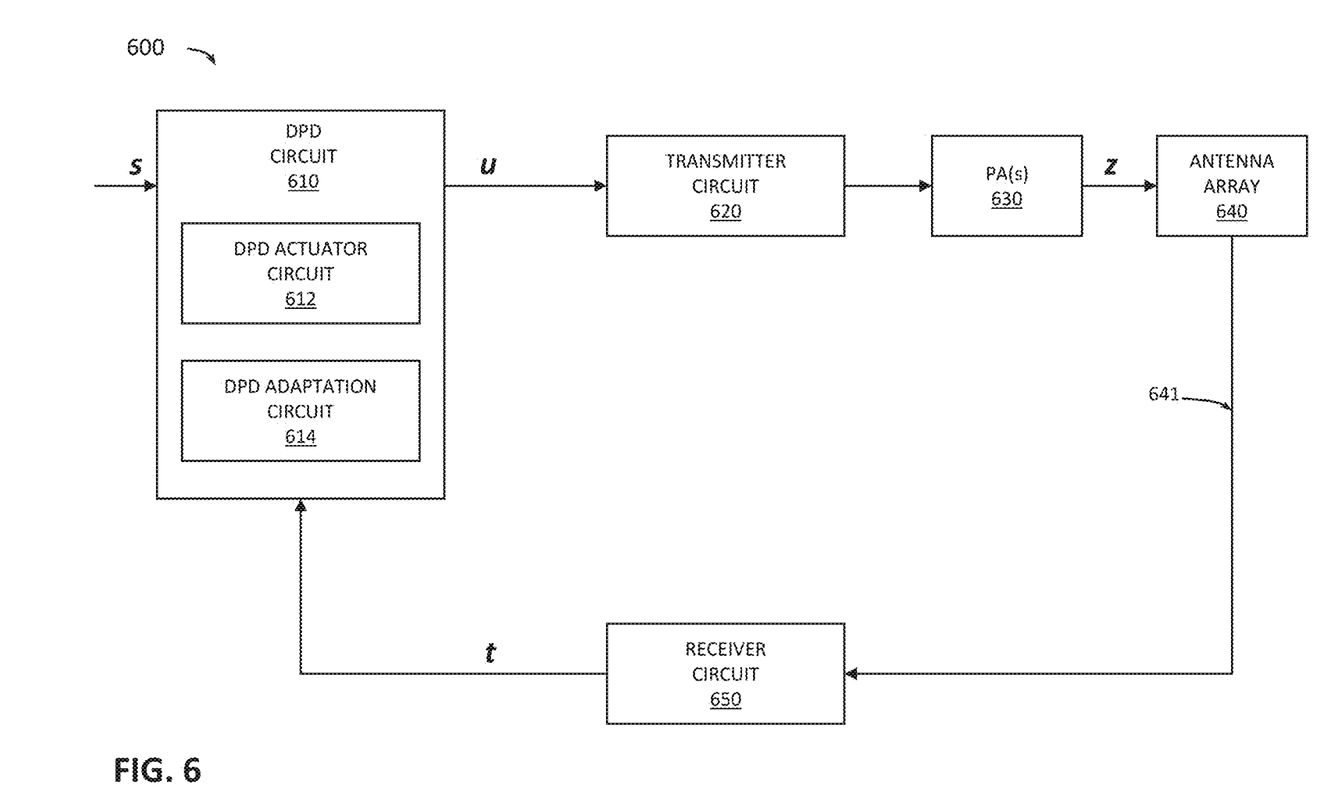
FIG. 6 is a schematic block diagram illustrating an exemplary RF transceiver system, according to some embodiments of the present disclosure.

Example RF Transceiver Implementing DPD Using LUT Interpolation with Optimized Multiplier Bit-Width FIG. 6 is a schematic block diagram illustrating an exemplary RF transceiver 600, according to some embodiments of the present disclosure. At a high level, the RF transceiver 600 may generate a RF signal for over-the-air for wireless transmission. The RF transceiver 600 may utilize various frontend components for the wireless transmission. One or more of the frontend components (e.g., a power amplifier) may cause nonlinear distortion. To improve linearity, the RF transceiver 600 may include a DPD circuit to pre-compensates the nonlinear distortion prior to transmission. The DPD circuit may utilize LUT and interpolation to implement a nonlinear function that approximates an inverse of the nonlinear distortion. As shown in FIG. 6, the RF transceiver 600 may include a DPD circuit 610, a transmitter circuit 620, one or more power amplifiers (PAs) 630, an antenna array 640, and a receiver circuit 650.

The DPD circuit 610 is configured to receive an input signal s, which may be a sequence of digital samples and represented in a vector form. The input signal s may include encoded information data bits, for example, to be transmitted wirelessly by the RF transceiver 600. In general, as used herein, each of the lower case, bold italics single-letter labels used in the present figures (e.g., labels s, u, and t, shown in FIG. 1), refers to a vector. In some embodiments, the input signal s may include one or more active channels in the frequency domain, but, for simplicity, an input signal with only one channel (i.e., a single frequency range of in-band frequencies) is described. In some embodiments, the input signal s may be a baseband digital signal. The DPD circuit 610 is configured to generate an output signal u based on the input signal s, which the output signal u may then be provided further to the transmitter circuit 620. To that end, the DPD circuit 610 may include a DPD actuator circuit 612 and a DPD adaptation circuit 614. In some embodiments, the DPD actuator circuit 612 may be configured to generate the output signal u based on the input signal s and output computed by the DPD adaptation circuit 614.

The transmitter circuit 620 may be configured to upconvert the signal u from a baseband signal to a higher frequency signal, such as an RF signal. The RF signal generated by the transmitter circuit 620 may be provided to the PA(s) 630. The PA(s) 630 may be configured to amplify the RF signal generated by the transmitter circuit 620 (thus, the PA(s) 630 may be driven by a drive signal that is based on the output of the DPD circuit 610) and output a respective amplified RF signal z (which may be a vector). The amplified RF signal z can be provided to a corresponding antenna element of the antenna array 640 to be wirelessly transmitted.

The RF transceiver 600 further includes a beamformer arrangement, configured to vary the input signals provided to the PA(s) 630 to steer the beam generated by the antenna array 640. Such a beamformer arrangement is not specifically shown in FIG. 6 because it may be implemented in different manners, e.g., as an analog beamformer (i.e., where the input signals to be amplifier by the PA(s) 630 are modified in the analog domain, i.e., after these signals have been converted from the digital domain to the analog domain), as a digital beamformer (i.e., where the input signals to be amplifier by the PA(s) 630 are modified in the digital domain, i.e., before these signals are converted from the digital domain to the analog domain), or as a hybrid beamformer (i.e., where the input signals to be amplifier by the PA(s) 630 are modified partially in the digital domain and partially in the analog domain). Examples of such beamformer arrangements are shown in some of the subsequent drawings.

Ideally, the amplified RF signal z from each of the PA(s) 630 is an upconverted and amplified version of the output of the transmitter circuit 620, e.g., an upconverted, amplifier, and beamformed version of the input signals. However, as discussed above, the amplified RF signals z can have distortions outside of the main signal components. Such distortions can result from nonlinearities in the response of the PA(s) 630. As discussed above, it may be desirable to reduce such nonlinearities. Accordingly, the RF transceiver 600 may further include at least one probe antenna element, configured to sense wireless RF signals transmitted by at least a subset of the antenna elements of the antenna array 640 and generate appropriate electrical signals. In various embodiments, a probe antenna element may either be one of the N antenna elements of the phased antenna array or be an additional antenna element (e.g., a calibration probe, i.e., an additional antenna element used for calibration of the phased antenna array) that may be provided in the vicinity of (e.g., on a single substrate with) the N antenna elements of the antenna array 640. At least a portion of the sensed output from the probe antenna element may be provided, as a feedback signal 641, to the receiver circuit 650. The output of the receiver circuit is coupled to the DPD circuit 610, in particular, to the DPD adaptation circuit 614. In this manner, an output signal t of the receiver circuit 650, which is a signal based on the feedback signal 641 indicative of the signal generated by one or more probe antenna elements, which, in turn, is indicative of the outputs from the PA(s) 630, may be provided to the DPD adaptation circuit 614 by way of the receiver circuit 650. The DPD adaptation circuit 614 may process the received signals and determine a DPD update to be applied by the DPD actuator circuit 612 to the input signal s to generate the actuator output u. A signal based on the actuator output u is provided as an input to the PA(s) 630, meaning that the actuator output u may be used to control the operation of the PA(s) 630.

In some embodiments, the DPD actuator circuit 612 may pre-distort the input signal s based on a nonlinear distortion produced by the PA(s) 630 such that the amplified signal z output by the PA(s) 630 has at least a less amount of nonlinear distortion. To that end, the DPD actuator circuit 612 may apply a nonlinear function approximating an inverse of the nonlinear distortion to the input signal s, for example, using the LUT interpolation and slope companding mechanisms discussed above with reference to FIGS. 2-4. In some embodiments, the DPD actuator circuit 612 may include blocks similar to the apparatus 200, for example, including, but not limited to, the bit extractor 110, the address generator 120, the memory block 104, the slope calculator 140, the compander 290, the multiplier 250, the bit-shifter, and the adder 170. In some embodiments, the RF transceiver 600 may include a memory block similar to the memory block 104 to store at least one LUT associated with a nonlinear component (e.g., the PA(s) 630) of the RF transceiver. In some embodiments, the RF transceiver 600 may store multiple LUTs associated with a nonlinear response of the PA(s) 630. In some embodiments, the RF transceiver 600 may store multiple LUTs associated with different nonlinear responses of the PA(s) 630 and the DPD actuator circuit 612 may select an LUT based on an update provided by the DPD adaptation circuit 614. In other embodiments, the DPD adaptation circuit 614 can be optional and may not be included in the DPD circuit 610.

In general, the RF transceiver 600 may be any device/ apparatus or system configured to support wireless transmission and reception of signals in the form of electromagnetic waves in the RF range of approximately 3 kHz to 300 GHz. In some embodiments, the RF transceiver 600 may be used for wireless communications, e.g., in a base station (BS) or a user equipment (UE) device of any suitable cellular wireless communications technology, such as Global System for Mobile Communication (GSM), Code Division Multiple Access (CDMA), or LTE. In a further example, the RF transceiver 600 may be used as, or in, e.g., a BS or a UE device of a millimeter-wave wireless technology such as 5G wireless (i.e., high-frequency/short-wavelength spectrum, e.g., with frequencies in the range between about 20 and 60 GHz, corresponding to wavelengths in the range between about 5 and 15 millimeters). In yet another example, the RF transceiver 600 may be used for wireless communications using Wi-Fi technology (e.g., a frequency band of 2.4 GHz, corresponding to a wavelength of about 12 cm, or a frequency band of 5.8 GHz, spectrum, corresponding to a wavelength of about 5 cm), e.g., in a Wi-Fi-enabled device such as a desktop, a laptop, a video game console, a smart phone, a tablet, a smart TV, a digital audio player, a car, a printer, etc. In some implementations, a Wi-Fi-enabled device may, e.g., be a node in a smart system configured to communicate data with other nodes, e.g., a smart sensor. Still in another example, the RF transceiver 600 may be used for wireless communications using Bluetooth technology (e.g., a frequency band from about 2.4 to about 2.485 GHz, corresponding to a wavelength of about 12 cm). In other embodiments, the RF transceiver 600 may be used for transmitting and/or receiving RF signals for purposes other than communication, e.g., in an automotive radar system, or in medical applications such as magneto-resonance imaging (MRI).

EXAMPLES

The following paragraphs provide various examples of the embodiments disclosed herein.

Example 1 is an apparatus including a slope calculator to calculate a slope value based on a first value and a second value associated with a function; a compander to compand the slope value to provide a companded slope value having a smaller bit-width than the calculated slope value; a multiplier to multiply the companded slope value by a third value to provide a correction value; and an adder to add the correction value to the first value or the second value to provide an interpolated value associated with the function.

Example 2 includes the apparatus of example 1, where the compander compands the slope value based on occurrence of one or more most-significant non-zero bits or one or more most-significant zero bits in the slope value.

Example 3 includes the apparatus of example 2, where the compander compands the slope value by discarding the one or more most-significant zero bits or the one or more most-significant non-zero bits of the slope value.

Example 4 includes the apparatus of example 3, where the compander discards the one or more most-significant zero bits of the slope value based on the slope value being positive.

Example 5 includes the apparatus of example 3, where the compander discards the one or more most-significant non-zero bits of the slope value based on the slope value being negative.

Example 6 includes the apparatus of any of examples 1-5, where the compander outputs one or more bits of the slope value adjacent to the discarded one or more most-significant zero bits or the discarded one or more most-significant non-zero bits as the companded slope value. Further, the compander can optionally output a sign bit of the slope value.

Example 7 includes the apparatus of any of examples 1-6 further including a bit-shifter to bit-shift the correction value by a bit-shift value before adding the correction value to the third value, the bit-shift value based at least in part on a number of the discarded one or more most-significant zero bits or the discarded one or more most-significant non-zero bits in the slope value.

Example 8 includes the apparatus of any of examples 1-7, where the bit-shifter bit-shifts the companded slope value by right-shifting the companded slope value by a difference between a bit-width of the third value and the number of the discarded one or more most-significant zero bits or the discarded one or more most-significant non-zero bits in the slope value.

Example 9 includes the apparatus of any of examples 1-7, where the compander generates the bit-shift value based on the number of the discarded one or more most-significant non-zero bits or the discarded one or more most-significant zero bits in the slope value.

Example 10 includes the apparatus of any of examples 1-9 further including a bit extractor to partition an input value into upper bits and lower bits, where the lower bits correspond to the third value; an address generator to generate, using the upper bits, successive addresses; and a memory block to provide the first value and the second value based on the successive addresses.

Example 11 includes the apparatus of any of examples 1-10, where the memory block stores a lookup table (LUT) including LUT values associated with a non-linear function, the LUT values including the first value and the second value.

Example 12 includes the apparatus of any of examples 1-11, where the LUT values are pre-distortion values associated with a radio frequency (RF) transceiver.

Example 13 includes an apparatus for use in a radio frequency (RF) transceiver including a memory block to store at least one lookup table (LUT) associated with a non-linear component of the RF transceiver; and a digital predistortion (DPD) circuit to generate a pre-distortion signal based on an input signal by obtaining, based on upper bits of the input signal, successive first and second values from the at least one LUT; reducing a dynamic range of a slope value associated with the successive first and second values to provide a companded slope value; and multiplying the companded slope value with lower bits of the input signal to provide a correction value.

Example 14 includes the apparatus of example 13, where the DPD circuit reduces the dynamic range of the slope value by discarding one or more most-significant zero bits or one or more most-significant non-zero bits of the slope value.

Example 15 includes the apparatus of any of examples 13-14, where the DPD circuit generates the pre-distortion signal by bit-shifting the correction value by a bit-shift value, the bit-shift value based at least in part on a number of the discarded one or more most-significant zero bits or the discarded one or more most-significant non-zero bits in the slope value; and adding the bit-shifted correction value to one of the successive first and second values.

Example 16 includes the apparatus of any of examples 13-15, where the DPD circuit generates the pre-distortion signal by determining the bit-shift value by subtracting the number of the discarded one or more most-significant zero bits or the discarded one or more most-significant non-zero bits in the slope value from a bit-width of the lower bits.

Example 17 includes a method for performing lookup table (LUT) with interpolation, the method including calculating, via a difference calculator, a difference value between a first LUT value and a second LUT value, the first LUT value and the second LUT value based on upper bits of an input value; companding, via a compander, the difference value to provide a companded difference value having a smaller bit-width than the calculated difference value; multiplying, via a multiplier, the companded difference value by lower bits of the input value to provide a correction value; and determining an interpolated value based on at least one of the correction value, the first LUT value, or the second LUT value.

Example 18 includes the method of example 17, where the companding includes discarding, via the compander, one or more most-significant zero bits or one or more most-significant non-zero bits of the difference value.

Example 19 includes the method of any of examples 17-18, where the determining the interpolated value includes right-shifting, via a bit-shifter, the correction value by a bit-shift value, the bit-shift value based at least in part on a number of the one or more most-significant zero bits or the one or more most-significant non-zero bits in the difference value; and adding, via an adder, the bit-shifted correction value to the first LUT value or the second LUT value.

Example 20 includes the method of any of examples 17-19, further including determining the bit-shift value by subtracting the number of the discarded one or more most-significant zero bits or the discarded one or more most-significant non-zero bits in the difference value from a bit-width of the lower bits.

Example 21 includes an apparatus including means for calculating a difference value between a first LUT value and a second LUT value, the first LUT value and the second LUT value based on upper bits of an input value; means for companding the difference value to provide a companded difference value having a smaller bit-width than the calculated difference value; means for multiplying the companded difference value by lower bits of the input value to provide a correction value; and means for determining an interpolated value based on at least one of the correction value, the first LUT value, or the second LUT value.

Example 22 includes the apparatus of example 21, where the means for companding the difference is further configured to discard one or more most-significant zero bits or one or more most-significant non-zero bits of the difference value.

Example 23 includes the apparatus of example 22, where the means for determining the interpolated value is further configured to right-shift the correction value by a bit-shift value, the bit-shift value based at least in part on a number of the one or more most-significant zero bits or the one or more most-significant non-zero bits in the difference value; and add the bit-shifted correction value to the first LUT value or the second LUT value.

Example 24 includes the apparatus of example 23, further including means for determining the bit-shift value by subtracting the number of the discarded one or more most-significant zero bits or the discarded one or more most-significant non-zero bits in the difference value from a bit-width of the lower bits.

Variations and Implementations

While embodiments of the present disclosure were described above with references to exemplary implementations as shown in FIGS. 1-6, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as bit extractors, address generators, slope calculators, multipliers, adders, bit-shifters, PA(s) and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to LUT interpolation, in various communication, medical, audio, video, and/or industrial systems.

Parts of various systems for implementing LUT interpolation and/or DPD as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the apparatuses and/or RF transceiver shown in FIGS. 1-2 and 6) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. An apparatus comprising:
a slope calculator to calculate a slope value based on a difference between a first value and a second value associated with a function;
a compander to compand the slope value to provide a companded slope value having a smaller bit-width than the calculated slope value;
a multiplier to multiply the companded slope value by a third value to provide a correction value;
an adder to add the correction value to the first value or the second value to provide an interpolated value associated with the function; and
a bit extractor to partition an input value into upper bits and lower bits, wherein the lower bits correspond to the third value, and wherein the first value and the second value are output values of the function based on the upper bits.

2. The apparatus of claim 1, wherein the compander compands the slope value based at least in part on occurrence of one or more most-significant non-zero bits or one or more most-significant zero bits in the slope value.

3. The apparatus of claim 2, wherein the compander compands the slope value by discarding at least the one or more most-significant zero bits or the one or more most-significant non-zero bits of the slope value.

4. The apparatus of claim 3, wherein the compander discards at least the one or more most-significant zero bits of the slope value based on the slope value being positive.

5. The apparatus of claim 3, wherein the compander discards at least the one or more most-significant non-zero bits of the slope value based on the slope value being negative.

6. The apparatus of claim 3, wherein the compander outputs one or more bits of the slope value adjacent to the discarded one or more most-significant zero bits or the discarded one or more most-significant non-zero bits as the companded slope value.

7. The apparatus of claim 3, further comprising:
a bit-shifter to bit-shift the correction value by a bit-shift value before adding the correction value to the third value, the bit-shift value based at least in part on a number of the discarded one or more most-significant zero bits or the discarded one or more most-significant non-zero bits in the slope value.

8. The apparatus of claim 7, wherein the bit-shifter bit-shifts the companded slope value by right-shifting the companded slope value by a difference between a bit-width of the third value and the number of the discarded one or more most-significant zero bits or the discarded one or more most-significant non-zero bits in the slope value.

9. The apparatus of claim 7, wherein the compander generates the bit-shift value based on the number of the discarded one or more most-significant non-zero bits or the discarded one or more most-significant zero bits in the slope value.

10. The apparatus of claim 1, further comprising:
an adddress generator to generate, using the upper bits, successive addresses; and
a memory block to provide the first value and the second value based on the successive addresses.

11. The apparatus of claim 10, wherein the memory block stores a lookup table (LUT) comprising LUT values associated with a non-linear function, the LUT values comprising the first value and the second value.

12. The apparatus of claim 11, wherein the LUT values are pre-distortion values associated with a radio frequency (RF) transceiver.

13. The apparatus of claim 1, wherein the compander further outputs a bit-shift value based on the companded slope value.

14. The apparatus of claim 1, wherein the compander further determines a sign of the slope value and compands the slope value based on whether the sign is positive or negative.

15. An apparatus for use in a radio frequency (RF) transceiver comprising:
a memory block to store at least one lookup table (LUT) associated with a non-linear component of the RF transceiver; and
a digital predistortion (DPD) circuit to generate a pre-distortion signal based on an input signal by:
obtaining, based on upper bits of the input signal, successive first and second values from the at least one LUT;
reducing a dynamic range of a slope value associated with the successive first and second values to provide a companded slope value;
multiplying the companded slope value with lower bits of the input signal to provide a correction value, wherein the DPD circuit generates the pre-distortion signal by:
bit-shifting the correction value by a bit-shift value, the bit-shift value based at least in part on a number of discarded one or more most-significant zero bits or discarded one or more most-significant non-zero bits in the slope value; and
adding the bit-shifted correction value to one of the successive first and second values.

16. The apparatus of claim 15, wherein the DPD circuit reduces the dynamic range of the slope value by:
discarding the one or more most-significant zero bits or the one or more most-significant non-zero bits of the slope value.

17. The apparatus of claim 15, wherein the DPD circuit generates the pre-distortion signal by:
determining the bit-shift value by subtracting the number of the discarded one or more most-significant zero bits or the discarded one or more most-significant non-zero bits in the slope value from a bit-width of the lower bits.

18. A method for performing lookup table (LUT) with interpolation, the method comprising:
calculating, via a difference calculator, a difference value between a first LUT value and a second LUT value, the first LUT value and the second LUT value based on upper bits of an input value;
companding, via a compander, the difference value to provide a companded difference value having a smaller bit-width than the calculated difference value;
multiplying, via a multiplier, the companded difference value by lower bits of the input value to provide a correction value;
determining an interpolated value based on at least one of the correction value, the first LUT value, or the second LUT value;
right-shifting, via a bit-shifter, the correction value by a bit-shift value, the bit-shift value based at least in part on a number of one or more most-significant zero bits or one or more most-significant non-zero bits in the difference value; and
adding, via an adder, the bit-shifted correction value to the first LUT value or the second LUT value.

19. The method of claim 18, wherein the companding comprises:
discarding, via the compander, the one or more most-significant zero bits or the one or more most-significant non-zero bits of the difference value.

20. The method of claim 18, further comprising:
determining the bit-shift value by subtracting the number of the discarded one or more most-significant zero bits or the discarded one or more most-significant non-zero bits in the difference value from a bit-width of the lower bits.

* * * * *